US010294953B2

(12) United States Patent
Kamiya et al.

(10) Patent No.: US 10,294,953 B2
(45) Date of Patent: May 21, 2019

(54) CENTRIFUGAL MULTIBLADE BLOWER

(71) Applicant: DENSO CORPORATION, Kariya, Aichi-pref. (JP)

(72) Inventors: Toshifumi Kamiya, Kariya (JP); Hiroaki Shiraishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 311 days.

(21) Appl. No.: 15/102,658

(22) PCT Filed: Jan. 29, 2015

(86) PCT No.: PCT/JP2015/000392
§ 371 (c)(1),
(2) Date: Jun. 8, 2016

(87) PCT Pub. No.: WO2015/136829
PCT Pub. Date: Sep. 17, 2015

(65) Prior Publication Data

US 2016/0305435 A1 Oct. 20, 2016

(30) Foreign Application Priority Data

Mar. 14, 2014 (JP) ................................ 2014-051818

(51) Int. Cl.
*F04D 29/28* (2006.01)
*F04D 25/06* (2006.01)
(Continued)

(52) U.S. Cl.
CPC ........... *F04D 29/289* (2013.01); *F04D 25/06* (2013.01); *F04D 25/082* (2013.01);
(Continued)

(58) Field of Classification Search
CPC ........ F04D 25/06; F04D 25/08; F04D 25/082; F04D 29/002; F04D 29/023;
(Continued)

(56) References Cited

U.S. PATENT DOCUMENTS 7,067,946 B2 * 6/2006 Noda .................... F04D 25/082 310/52
2007/0065277 A1 3/2007 Muller et al.
2011/0116928 A1 * 5/2011 Czulak .................. F04D 25/082 416/95

FOREIGN PATENT DOCUMENTS

JP H07004396 A 1/1995
JP H09028641 A 2/1997
(Continued)

OTHER PUBLICATIONS

International Search Report and Written Opinion (in Japanese with English Translation) for PCT/JP2015/000392, dated Apr. 28, 2015; ISA/JP.

*Primary Examiner* — Charles G Freay
*Assistant Examiner* — Chirag Jariwala
(74) *Attorney, Agent, or Firm* — Harness, Dickey & Pierce, P.L.C.

(57) ABSTRACT

A centrifugal multiblade blower includes: an electric motor; and an impeller blowing off air outward in a radial direction by being rotated by the electric motor. A main plate of the impeller has an uneven part on one surface adjacent to the electric motor in a thickness direction of the main plate. The one surface is in contact with air passing through inside of the electric motor. A surface shape of the uneven part is formed in manner that, among a whole surface of the uneven part, a total surface area of a surface facing inward in a radial direction of the motor is larger than an imaginary smooth
(Continued)

surface on which the surface shape of the uneven part is defined to be a smooth surface without the uneven part.

19 Claims, 8 Drawing Sheets

(51) Int. Cl.

| | |
|---|---|
| ***F04D 25/08*** | (2006.01) |
| ***F04D 29/42*** | (2006.01) |
| ***H02K 7/00*** | (2006.01) |
| ***H02K 9/26*** | (2006.01) |
| *H02K 7/14* | (2006.01) |
| *H02K 9/06* | (2006.01) |
| *H02K 9/28* | (2006.01) |

(52) U.S. Cl.
CPC ....... *F04D 29/281* (2013.01); *F04D 29/4226* (2013.01); *H02K 7/003* (2013.01); *H02K 9/26* (2013.01); *F05D 2250/181* (2013.01); *F05D 2250/294* (2013.01); *H02K 7/14* (2013.01); *H02K 9/06* (2013.01); *H02K 9/28* (2013.01)

(58) Field of Classification Search
CPC ............... F04D 29/403; F04D 29/4206; F04D 29/4226; F04D 29/281; F04D 29/289; H02K 9/04; H02K 9/06; H02K 9/26; H02K 9/28; H02K 7/003; H02K 7/14; F05D 2250/181; F05D 2250/294; F05D 2260/95; F05B 2250/18; F05B 2260/221; F05B 2260/224; F05B 2260/2241
USPC ............ 417/352, 353, 357, 366, 369, 423.7, 417/423.8, 423.9, 423.14, 430; 310/52; 416/182–188
See application file for complete search history.

(56) References Cited

FOREIGN PATENT DOCUMENTS

| | | | |
|---|---|---|---|
| JP | 2002202098 | A | 7/2002 |
| JP | 2003328999 | A | 11/2003 |
| JP | 2010053814 | A | 3/2010 |
| JP | 2010059845 | A | 3/2010 |

* cited by examiner

CENTRIFUGAL MULTIBLADE BLOWER

CROSS REFERENCE TO RELATED APPLICATIONS

This application is a U.S. National Phase Application under 35 U.S.C. 371 of International Application No. PCT/JP2015/000392 filed on Jan. 29, 2015 and published in Japanese as WO 2015/136829 A1 on Sep. 17, 2015. This application is based on and claims the benefit of priority from Japanese Patent Application No. 2014-051818 filed on Mar. 14, 2014. The entire disclosures of all of the above applications are incorporated herein by reference.

TECHNICAL FIELD

The present disclosure relates to a structure of centrifugal multiblade blower rotated by an electric motor, in particular, to a structure of an impeller of the centrifugal multiblade blower.

BACKGROUND ART

Patent Literature 1 describes a centrifugal multiblade blower such as sirocco fan or turbo fan. The blower is equipped with an electric motor and an impeller rotated by the electric motor to blow off air outward in a radial direction.

The impeller has plural blades arranged around a rotation shaft of the electric motor, and a main plate holding the blades and transmitting the rotation power generated by the electric motor to the blades. The main plate has a main part in which plural penetration holes are arranged in the circumferential direction, and a blockade part closing the penetration holes. In the blower of Patent Literature 1, noise resulting from the penetration hole of the main plate is restricted, and water is prevented from entering the electric motor through the penetration hole of the main plate.

PRIOR ART LITERATURES

Patent Literature

Patent Literature 1: JP 2010-53814 A

SUMMARY OF INVENTION

A passage through which air flows from the blower is generally made of resin material and rubber material. A piping forming the passage is mainly made of, for example, resin material, and a sealing material in the passage is mainly made of rubber material. Moreover, an electric motor with a brush is adopted as a drive source of the blower in many cases, and copper powder which is wear powder is generated from the brush and a commutator of the electric motor. The copper powder flows with the air from the blower, and adheres to the resin material or the rubber material downstream of the blower in the air flow.

It is well-known that resin material and rubber material deteriorate if in contact with metal, in particular, copper. The degradation in resin material and rubber material resulting from copper is called as copper harm. The copper harm will be generated if copper powder flowing out of the blower as mentioned above adheres to resin material or rubber material. The copper harm is one of the issues in an air-conditioner for a vehicle where the blower of Patent Literature 1 is used.

It is possible to implement a measure of improving the resin material and the rubber material, which are affected by the copper powder, to withstand the copper harm. However, in order to implement such a measure, it will be necessary to add an additive to the resin material for improving the property withstanding the copper harm. The addition of additive causes a cost rise, for example, in resin material. Inventors, on the other hand, discover a phenomenon in which the wear powder adheres to a main plate of an impeller, and study to increase wear powder caught by the main plate in order to reduce wear powder flowing to the downstream of the impeller in the air flow.

The present disclosure has an object to provide a centrifugal multiblade blower in which copper powder is restricted from flowing downstream of the impeller in a flow of air by the main plate of the impeller that can catch copper powder flowing from the electric motor with the brush.

According to an aspect of the present disclosure, a centrifugal multiblade blower includes: an electric motor having a motor rotation shaft that rotates at a motor axial center, a commutator that rotates with the motor rotation shaft, and a brush in contact with the commutator; and an impeller having a main plate connected with the motor rotation shaft to rotate integrally with the motor rotation shaft, and a plurality of blades connected with the main plate and arranged around the motor axial center. The impeller blows off air outward in a radial direction by being rotated by the electric motor.

The main plate has one surface adjacent to the electric motor in a thickness direction of the main plate. The one surface is in contact with air passing through inside of the electric motor. The one surface has an uneven part with an uneven surface shape. The uneven surface shape of the uneven part is formed in manner that, among a whole surface of the uneven part, a total surface area of a surface facing inward in the radial direction relative to an imaginary plane perpendicular to the motor axial center and having a center at the motor axial center is larger than an imaginary smooth surface assumed that the uneven surface shape of the uneven part is a smooth surface having no uneven part.

Accordingly, the total surface area is increased to be larger than the imaginary smooth surface. Therefore, it is possible to catch more copper powder flowing from the electric motor by the main plate of the impeller, compared with a case where the surface is a smooth surface having no uneven part. As a result, it is possible to suppress copper powder from flowing downstream of the impeller in the air flow.

DESCRIPTION OF EMBODIMENTS

Figure 1:
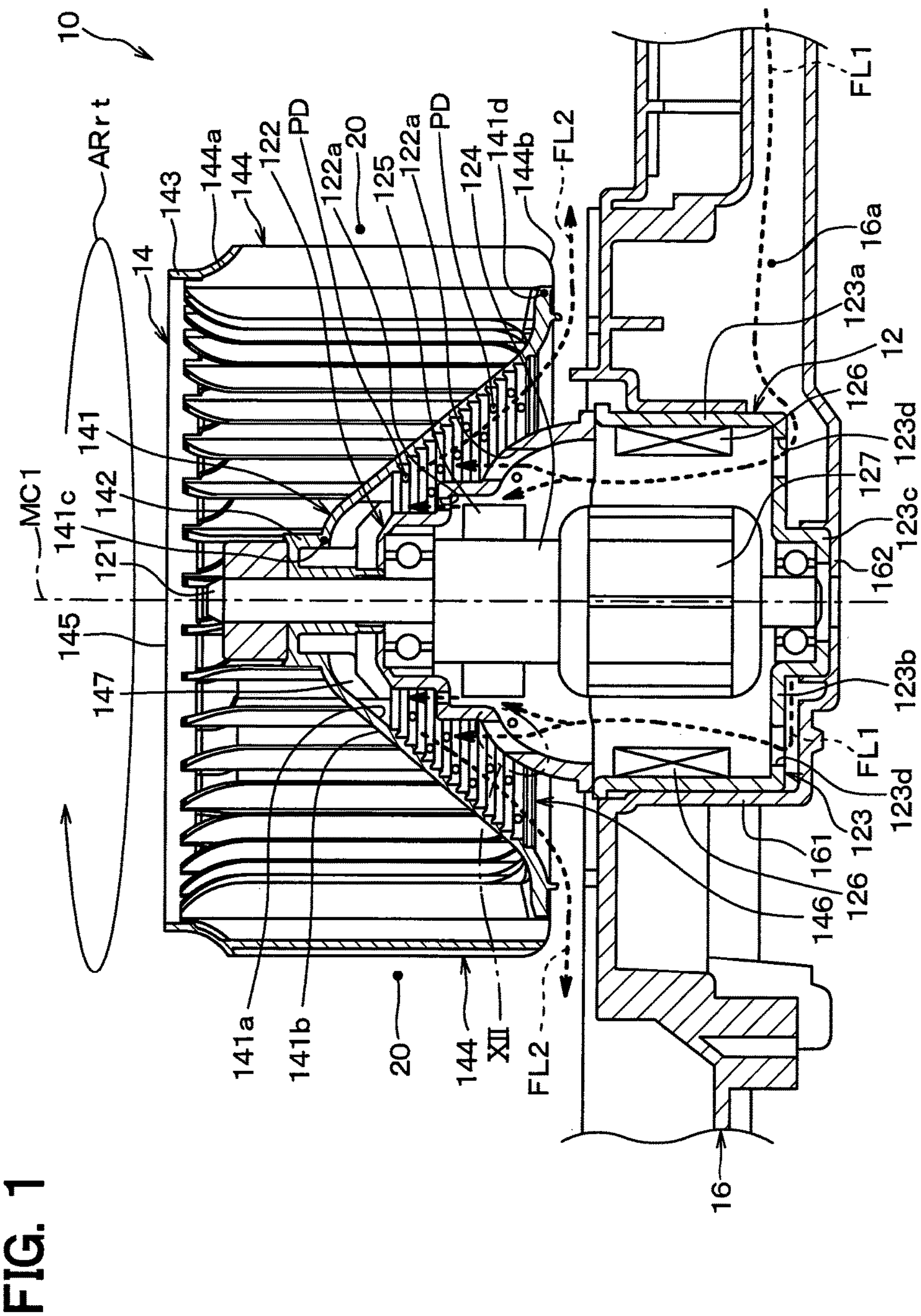
FIG. 1 is a sectional view illustrating an electric motor and an impeller of a blower according to a first embodiment.

Hereinafter, embodiments will be described according to the drawings. Same or equivalent portions among respective embodiments below are labeled with same reference numerals in the drawings.

First Embodiment

A first embodiment is described. FIG. 1 is a sectional view illustrating an electric motor 12 and an impeller 14 of a centrifugal multiblade blower 10 (henceforth referred to the blower 10) of the first embodiment. The blower 10 shown in FIG. 1 is adopted in an air-conditioner for a vehicle, which blows off conditioned air into a passenger compartment of the vehicle, and is operated to send air for conditioning. The blower 10 is, specifically, a sirocco fan.

The blower 10 is received in an air-conditioning case (not shown) made of resin material, and an air passage through which the air-conditioning air flows is formed downstream of the blower 10 in a flow of air by the air-conditioning case. An evaporator (not shown) which cools the air-conditioning air is disposed downstream of the blower 10 in the flow of air in the air passage. Air leak is prevented by a seal material made of rubber around the evaporator. In FIG. 1, one-point chain line MC1 represents a motor axial center MC1 around which the electric motor 12 is rotated.

As shown in FIG. 1, the blower 10 includes the electric motor 12, the impeller 14, a scroll casing (not shown), and a holder 16 for fixing the electric motor 12 to the scroll casing.

Although illustration is omitted, the scroll casing is a product made of resin material, and receives the impeller 14 and forms an air gathering channel 20 defined to surround the impeller 14 to gather and blow off air flowing out of the impeller 14. The scroll casing has an intake port for drawing air, which is opened to one side in the axial direction of the motor axial center MC1. A bell mouth is formed around the outer edge of the intake port, and extends toward the inner circumference of the impeller 14 to lead the intake air to the intake port.

The electric motor 12 is a direct current motor with a brush, and is used for driving the blower of the air-conditioner for a vehicle. The electric motor 12 includes a motor rotation shaft 121, a housing 122, a yoke 123, a commutator 124, a brush 125, a motor stator 126, and a motor rotor 127.

The motor rotation shaft 121 is an axial component extending in the axial direction of the motor axial center MC1, i.e., the motor axial center MC1 direction, and is rotated at the motor axial center MC1. The motor rotation shaft 121 is projected from the housing 122 toward the intake port of the scroll casing.

The housing 122 and the yoke 123 are joined to each other to constitute a case of the electric motor 12 as a whole. The housing 122 is arranged adjacent to the intake port in the motor axial center MC1 direction relative to the yoke 123. The commutator 124 and the brush 125 are received inside the housing 122.

The yoke 123 is made of magnetic member such as iron, and has a side wall 123*a* forming a cylinder shape with a center corresponding to the motor axial center MC1 and a yoke bottom 123*b* closing an end of the side wall 123*a* opposite from the housing 122. The yoke bottom 123*b* has a projection part 123*c* projected in the motor axial center MC1 direction. The motor stator 126 and the motor rotor 127 are received inside the yoke 123.

The yoke bottom 123*b* has plural cooling wind introduction holes (through holes) 123*d* as air feed port for taking in a cooling wind inside of the electric motor 12. The housing 122 has plural cooling wind outlet pores (through holes) 122*a* as air exit port for discharging the cooling wind which is air flowed through inside of the electric motor 12. The cooling wind outlet pore 122*a* is formed so that the cooling wind is blown out in the direction along the motor axial center MC1 toward one surface 141*a* (refer to FIG. 2) of a main plate 141 of the impeller 14. Concretely, the cooling wind outlet pore 122*a* is a through hole passing through the housing in parallel with the motor axial center MC1.

The cooling wind is taken in from the adjacency of the air blow-off port of the air gathering channel 20 of the scroll casing, and flows into the electric motor 12 from the cooling wind introduction hole 123*d* as shown in an arrow FL1, then flows out of the cooling wind outlet pore 122*a*. The cooling wind which flows in the arrow FL1 inside the electric motor 12 cools components received in the housing 122 and the yoke 123, for example, the commutator 124, the brush 125, the motor stator 126, and the motor rotor 127.

The motor rotor 127 is a well-known part for a direct-current motor with a brush, and is fixed to the motor rotation shaft 121 to rotate integrally with the motor rotation shaft 121. The motor rotor 127 has plural coils arranged around the perimeter of the motor rotation shaft 121. Each of the coils of the motor rotor 127 is electrically connected to the commutator 124.

The motor stator 126 is a well-known part for a direct-current motor with a brush, and is made of plural permanent magnets fixed to the inner surface of the side wall 123*a* of the yoke 123. A slight clearance is defined between the motor stator 126 and the motor rotor 127 in a motor radial direction which is a radial direction around the motor axial center MC1. The motor stator 126 is disposed around the motor axial center MC1. In other words, the motor stator 126 is arranged to surround the outer side of the motor rotor 127.

The commutator 124 and the brush 125 are well-known parts for a direct-current motor with a brush, and are made of conductors. Concretely, the conductor forming the commutator 124 and the brush 125 is a copper component containing carbon. The commutator 124 and the brush 125 are in contact with each other to secure the electric connection state. The commutator 124 is fixed to the motor rotation shaft 121, and rotates integrally with the motor rotation shaft 121. The brush 125 is fixed to the housing 122, and is biased to press against the commutator 124 from the outer side of the commutator 124 in the motor radial direction. Therefore, when rotating with the motor rotation shaft 121, the commutator 124 slides in contact with the brush 125, thereby causing the sliding friction. The sliding friction produces wear powder PD of copper and carbon which are main materials of the commutator 124 and the brush 125. The wear powder PD flows out of the cooling wind outlet pore 122*a* together with the cooling wind flowing in the arrows FL1 and FL2.

The holder 16 is a motor support component for fixing the electric motor 12 to the scroll casing, and is fixed to the scroll casing. The holder 16 is, for example, a component made of resin material fabricated by injection molding. The holder 16 has a yoke insertion part 161 in an approximately cylinder shape in which the yoke 123 of the electric motor 12 is inserted, and a holder bottom 162 disposed at the bottom side of the yoke insertion part 161. The holder 16 has an air passage 16*a* which leads the cooling wind of the electric motor 12 from the adjacency of the air blow-off port of the air gathering channel 20 of the scroll casing to the cooling wind introduction holes 123*d* of the electric motor 12.

The projection part 123*c* of the yoke 123 is inserted into the holder bottom 162 in the motor axial center MC1 direction. The side wall 123*a* of the yoke 123 is press-fitted to the yoke insertion part 161 of the holder 16 in the motor axial center MC1 direction. The yoke 123 of the electric motor 12 is fixed to the holder 16, for example, by a screw.

The impeller 14 includes the main plate 141, a connecting boss part 142, a side board 143, and plural blades 144. The impeller 14 is rotated by the electric motor 12 around the motor axial center MC1, such that air drawn from the intake port of the scroll casing is blown off outward in the motor radial direction. That is, air is blown off to the air gathering channel 20 of the scroll casing.

The impeller 14 is a product made of resin, such as polypropylene (PP), ABS or PBT. Therefore, the impeller 14 is charged in minus by friction with air. Moreover, the resin which forms the impeller 14 is improved in the property of withstanding copper harm, for example, by adding an additive.

The blades 144 are tabular blades arranged in the circumferential direction around the motor axial center MC1. A first end 144*a* of the blade 144 in the motor axial center MC1 direction adjacent to the intake port of the scroll casing is connected with the annular side board 143, thereby connecting the first ends 144*a* of the blades 144 mutually. A second end 144*b* of the blade 144 in the motor axial center MC1 direction far from the intake port of the scroll casing is connected with the main plate 141, thereby connecting the second ends 144*b* of the blades 144 mutually.

The central part 141*c* of the main plate 141 is connected with the connecting boss part 142, and the peripheral part 141*d* of the main plate 141 is connected with the second end 144*b* of the blade 144. The motor rotation shaft 121 is inserted in the center of the connecting boss part 142, and the connecting boss part 142 is fixed to the motor rotation shaft 121 by plastically deforming. Thereby, the main plate 141 is connected with the motor rotation shaft 121, and rotates integrally with the motor rotation shaft 121. That is, the rotation power of the electric motor 12 is transmitted to the impeller 14 from the motor rotation shaft 121.

The impeller 14 is rotated in an arrow direction ARrt by the electric motor 12, and air is drawn to the inner side of the annular side board 143 from the air suction part 145 located adjacent to the first end in the motor axial center MC1 direction. The drawn air is blown off from between the blades 144 outward in the motor radial direction.

The central part 141*c* of the main plate 141 connected with the connecting boss part 142 has a cross-sectional form depressed upward in FIG. 1, i.e., toward the side board 143 in the motor axial center MC1 direction with respect to the peripheral part 141*d* connected with the blade 144. A part of the electric motor 12 is arranged inside the recessed part of the main plate 141. In other words, the main plate 141 has a taper shape separating from the side board 143 toward the motor axial center MC1, as going inward in the motor radial direction. Therefore, the one surface 141*a* of the main plate 141 is an inner surface of the main plate 141, and the other surface 141*b* is an outer surface of the main plate 141.

Figure 2:
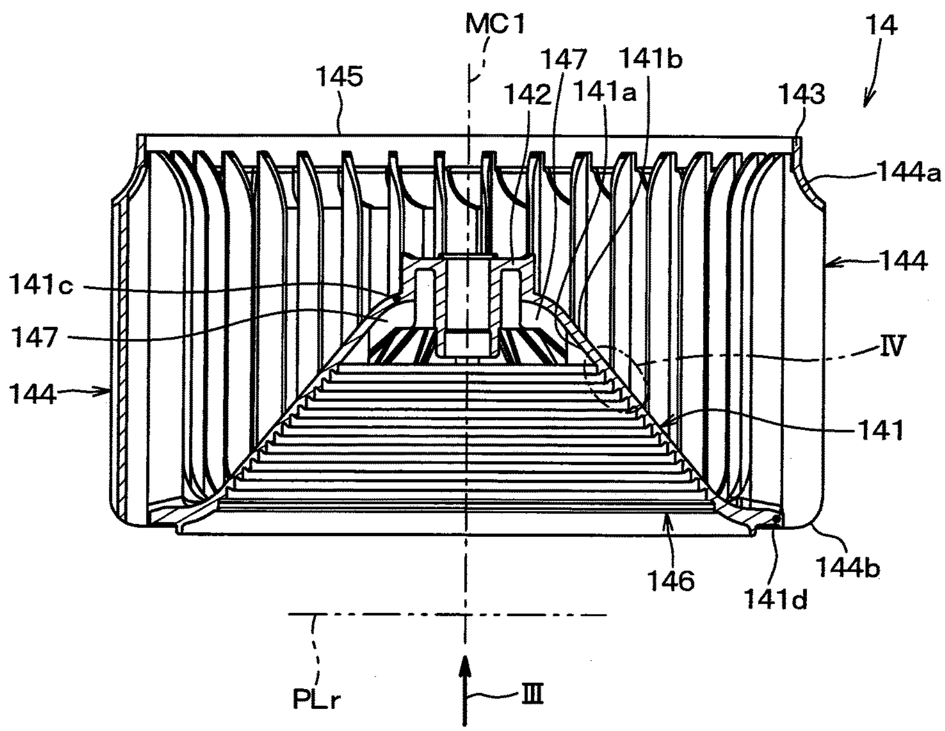
FIG. 2 is a cross-sectional view taken along a plane containing a motor axial center to illustrate only the impeller in the first embodiment.
Figure 3:
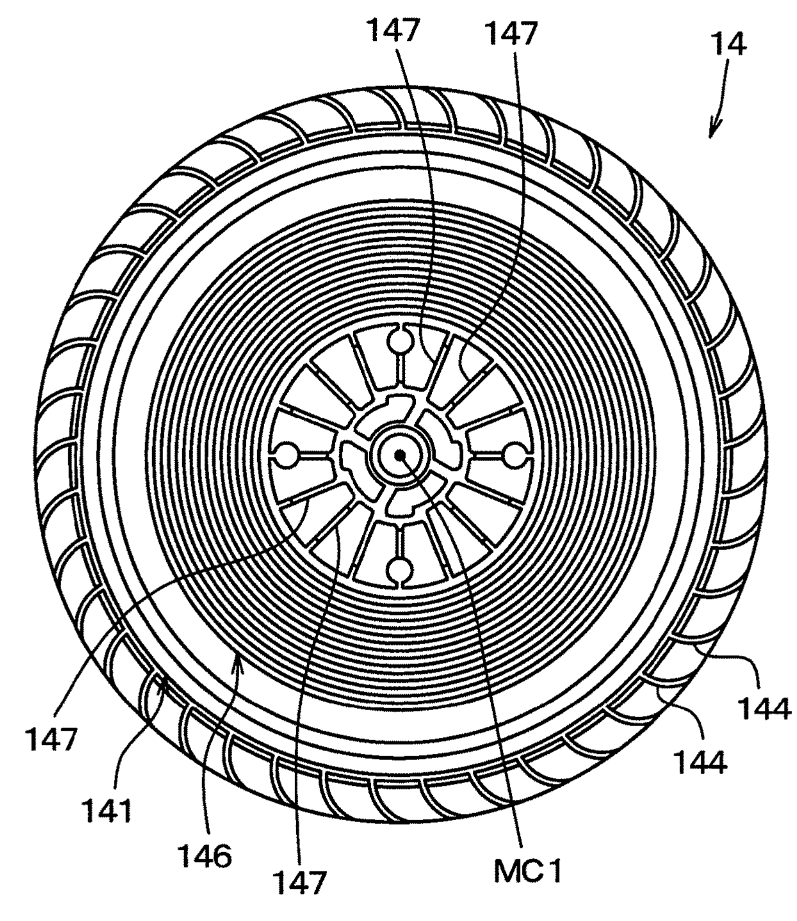
FIG. 3 is a view seen in an arrow direction III of FIG. 2.

Next, the impeller 14 is further explained using FIG. 2 and FIG. 3. FIG. 2 and FIG. 3 are drawings showing only the impeller 14. FIG. 2 is a cross-sectional view of the impeller 14 taken along a plane containing the motor axial center MC1, and FIG. 3 is a view seen in an arrow direction III of FIG. 2.

Since the main plate 141 is tabular as shown in FIG. 2 and FIG. 3, the main plate 141 has the one surface 141*a* adjacent to the electric motor 12 in the thickness direction of the main plate 141, and the other surface 141*b* on the opposite side. The cooling wind which flowed out of the cooling wind outlet pore 122*a* of the electric motor 12, as shown in an arrow FL2 (refer to FIG. 1), flows in contact with the one surface 141*a* of the main plate 141, outward in the motor radial direction along the one surface 141*a*. In contrast, air which flows from the air suction part 145 of the impeller 14 into between the blades 144 flows outward in the motor radial direction along the other surface 141*b* of the main plate 141.

Figure 4:
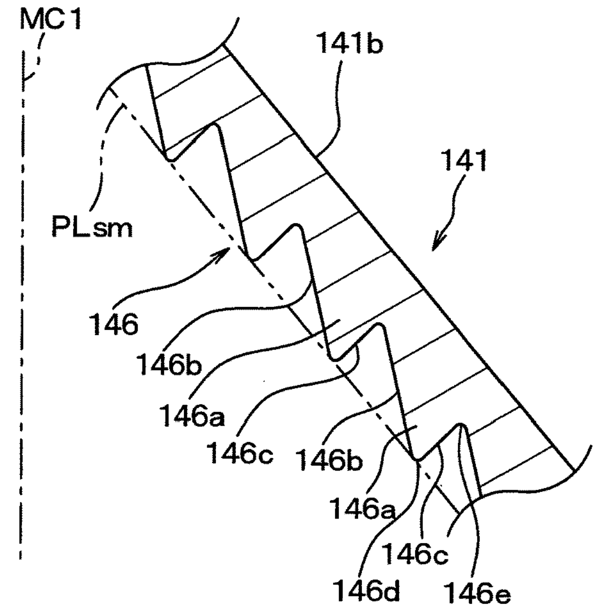
FIG. 4 is an enlarged view of a section IV of FIG. 2.

The main plate 141 has an uneven part 146 which constitutes an uneven surface shape on the one surface 141*a*. The surface shape of the uneven part 146 is shown in FIG. 4 which is a cross-sectional view enlarged in a section IV of FIG. 2. That is, the surface shape of the uneven part 146 has plural protrusion parts 146*a*. As shown in FIG. 4, the protrusion parts 146*a* are arranged in the motor radial direction along the one surface 141*a* (refer to FIG. 2) of the main plate 141, and a groove is defined between the protrusion parts 146*a* adjacent to each other. As shown in FIG. 3, each of the protrusion parts 146*a* extends in a motor circumferential direction that is a circumferential direction around the motor axial center MC1, and forms the shape of a ring centering at the motor axial center MC1.

The cross-sectional form of the protrusion part 146*a* is explained in detail. The protrusion part 146*a* is formed so that the cross-sectional form of the protrusion part 146*a* taken along a plane containing the motor axial center MC1, which is shown in FIG. 4, has a shape of triangle tapered to a tip end of the protrusion part. Therefore, each protrusion part 146*a* of the main plate 141 has a pair of protrusion surfaces 146*b*, 146*c* which form the shape of triangle in the cross-sectional form.

One 146*b* of the protrusion surfaces 146*b*, 146*c* is a first protrusion surface 146*b* facing inward in the motor radial direction relative to a radial direction plane PLr (refer to FIG. 2) corresponding to an imaginary plane PLr perpendicular to the motor axial center MC1 and spreading in the motor radial direction. Speaking directly, the first protrusion surface 146*b* is a taper surface facing inward in the motor radial direction while being inclined relative to the motor axial center MC1. A taper angle of the first protrusion surface 146*b* is smaller than a taper angle of the main plate 141 that is a taper angle of the one surface 141*a* of the main plate 141.

In contrast, the other surface 146*c* of the pair of protrusion surfaces 146*b*, 146*c* is a second protrusion surface 146*c* facing outward in the motor radial direction with respect to the radial direction plane PLr (refer to FIG. 2). Concretely, the second protrusion surface 146*c* is a taper surface facing outward in the motor radial direction while being inclined relative to the motor axial center MC1. For example, a taper angle of the second protrusion surface 146*c* is smaller than a taper angle of an imaginary taper surface perpendicular to the main plate 141, in other words, a taper angle of an imaginary taper surface which spreads in the thickness direction of the main plate 141.

Thus, the main plate 141 has the uneven part 146. Among a whole surface of the uneven part 146, a total surface area of the uneven part 146 facing inward in the motor radial direction than the radial direction plane PLr, i.e., except the second protrusion surface 146c, is larger than an imaginary smooth surface PLsm (refer to FIG. 4) assumed to be a smooth surface without the uneven part 146. In other words, the uneven part 146 increases the total surface area facing inward in the motor radial direction than the radial direction plane PLr, on the one surface 141a of the main plate 141, compared with a case where the one surface 141a is assumed to be a smooth surface. In this embodiment, for example as shown in FIG. 4, the imaginary smooth surface PLsm is an imaginary smooth surface which is in contact with all of top parts 146d which are tip ends of the protrusion parts 146a.

The top part 146d of the protrusion part 146a and a lowermost part 146e which is a base end of the protrusion part 146a are rounded with a minute corner R having, for example, a curvature radius of about 0.1 mm or larger in the cross-sectional form of FIG. 4.

As shown in FIG. 1, the uneven part 146 having the plural protrusion parts 146a is ranged from a position on the one surface 141a overlapping with the outer side of the brush 125 of the electric motor 12 in the motor radial direction to a peripheral part, i.e., the periphery side 141d of the main plate 141.

When the uneven part 146 is compared with the yoke 123 of the electric motor 12 in FIG. 1, the uneven part 146 is formed so that the maximum outer diameter of the uneven part 146 around the motor axial center MC1 is larger than the outer diameter of the side wall 123a of the yoke 123, i.e., the outer diameter of the yoke 123.

As shown in FIG. 2 and FIG. 3, the main plate 141 has plural radial ribs 147 extending radially from the connecting boss part 142 in the motor radial direction, on the side adjacent to the electric motor 12. The number of the radial ribs 147 is sixteen. Each of the radial ribs 147 is projected toward the electric motor 12 not to interfere with the electric motor 12 by forming a clearance relative to the electric motor 12.

As mentioned above, according to this embodiment, the main plate 141 of the impeller 14 has the uneven part 146 on the one surface 141a adjacent to the electric motor 12 in the thickness direction of the main plate 141. The surface shape of the uneven part 146 is formed such that the total surface area of the surface facing inward in the motor radial direction than the radial direction plane PLr, among the whole surface of the uneven part 146, is larger than the imaginary smooth surface PLsm (refer to FIG. 4) assumed to be a smooth surface having no uneven part 146. Therefore, compared with the case where the one surface 141a of the main plate 141 is a smooth surface not having the uneven part 146, the main plate 141 of the impeller 14 can catch more copper powder which is wear powder PD (refer to FIG. 1) flowing from the electric motor 12. As the result, it is possible to suppress the copper powder from flowing downstream of the impeller 14 in the flow of air. In addition, it is confirmed by experiments that the copper powder which flowed out of the electric motor 12 more easily adheres to the main plate 141, as the total surface area facing inward in the motor radial direction, i.e., except the second protrusion surface 146c is larger on the one surface 141a of the main plate 141.

According to this embodiment, since the impeller 14 is a component made of resin material, minus charging occurs due to friction between air and the impeller 14 while the impeller 14 is rotated based on a relation of triboelectric series. Therefore, wear powder PD emitted from the electric motor 12 can be drawn to the one surface 141a of the impeller 14 electrified with static electricity. Further, the wear powder PD is forced on the one surface 141a of the main plate 141 of the impeller 14 by the cooling wind blown off from the cooling wind outlet pore 122a of the electric motor 12, and adheres to the one surface 141a. Therefore, the impeller 14 that is a product made of resin material can catch much wear powder PD from the electric motor 12.

The copper powder which is wear powder PD adhering to the main plate 141 of the impeller 14 can be fixed on the one surface 141a of the main plate 141 due to action such as Coulomb force or intermolecular force working among minute particles to be drawn to each other. Since many wear powder PD can be caught with the impeller 14, the wear powder PD can be restricted from dispersing into the air gathering channel 20 of the scroll casing. As a result, the product life of the air-conditioner for a vehicle can be increased by restricting copper harm resulting from copper adhering to a rubber component and a resin component located downstream of the impeller 14 in the flow of air. Alternatively, it is unnecessary to add an additive for preventing the copper harm to the rubber component and the resin component. In this case, it is possible to reduce the cost of the air-conditioner for a vehicle.

According to this embodiment, the uneven part 146 of the main plate 141 is located adjacent to the electric motor 12 and includes the protrusion parts 146a extending in the motor circumferential direction. The protrusion part 146a is formed so that the cross-sectional form of the protrusion part 146a taken along the plane containing the motor axial center MC1 has the shape of tapering triangle. Therefore, the area of the main plate 141 adjacent to the electric motor 12 can be increased, and many wear powder PD can be made to adhere to the main plate 141. The surface area of the main plate 141 adjacent to the electric motor 12 can be easily increased without enlarging the size of the impeller 14.

According to this embodiment, the first protrusion surface 146b of the pair of protrusion surfaces 146b, 146c which constitute the surface of the protrusion part 146a is a surface facing inward in the motor radial direction relative to the radial direction plane PLr (refer to FIG. 2). Therefore, wear powder PD which flowed out of the electric motor 12 easily adheres to the first protrusion surface 146b. It is possible to catch many wear powder PD with the impeller 14.

According to this embodiment, the second protrusion surface 146c of the pair of protrusion surfaces 146b, 146c is a surface facing outward in the motor radial direction relative to the radial direction plane PLr. Therefore, it is possible to increase the surface area of the first protrusion surface 146b to which wear powder PD adheres easily in the uneven part 146 of the impeller 14. Therefore, the impeller 14 can be improved in performance catching the wear powder PD.

According to this embodiment, since each of the protrusion parts 146a which constitute the uneven part 146 has the shape of a ring around the motor axial center MC1, the uneven part 146 is formed not to increase the off-center of the impeller 14 relative to the motor axial center MC1. In other words, the uneven part 146 is formed such that the center-of-gravity position of the impeller 14 does not move away from the motor axial center MC1, while the protrusion part 146a is formed. Therefore, the surface area can be increased on the one surface 141*a* of the impeller 14 by keeping the rotation balance when the impeller 14 rotates. The amount of the wear powder PD which adheres to the one surface 141*a* can be increased.

According to this embodiment, the cooling wind outlet pore 122*a* of the electric motor 12 is the through hole passing through the housing in parallel with motor axial center MC1. In other words, the cooling wind outlet pore 122*a* is formed so that air is blown out toward the one surface 141*a* of the main plate 141 of the impeller 14 in the direction along the motor axial center MC1. Therefore, compared with a case where air is blown out from the cooling wind outlet pore 122*a* outward in the motor radial direction, it takes long time for the circulating air out of the cooling wind outlet pore 122*a* to flow into the air gathering channel 20 of the scroll casing. Thereby, the amount of wear powder PD which adheres to the one surface 141*a* of the impeller 14 can be increased.

According to this embodiment, the radial ribs 147 extending in the motor radial direction are defined on the main plate 141 of the impeller 14 adjacent to the electric motor 12. Thus, the air which flowed out of the cooling wind outlet pore 122*a* of the electric motor 12 is agitated by rotation of the impeller 14, and stagnation arises in the flow of air. Therefore, the wear powder PD which flowed out of the electric motor 12 with the air easily stays at the stagnant part such that the performance of the impeller 14 which catches wear powder PD can be improved.

Second Embodiment

A second embodiment is described. In this embodiment, a point different from the first embodiment is mainly explained, and explanation of a portion the same or equal to the first embodiment is omitted or simplified. This is the same in the third embodiment and the subsequent embodiments mentioned below.

Figure 5:
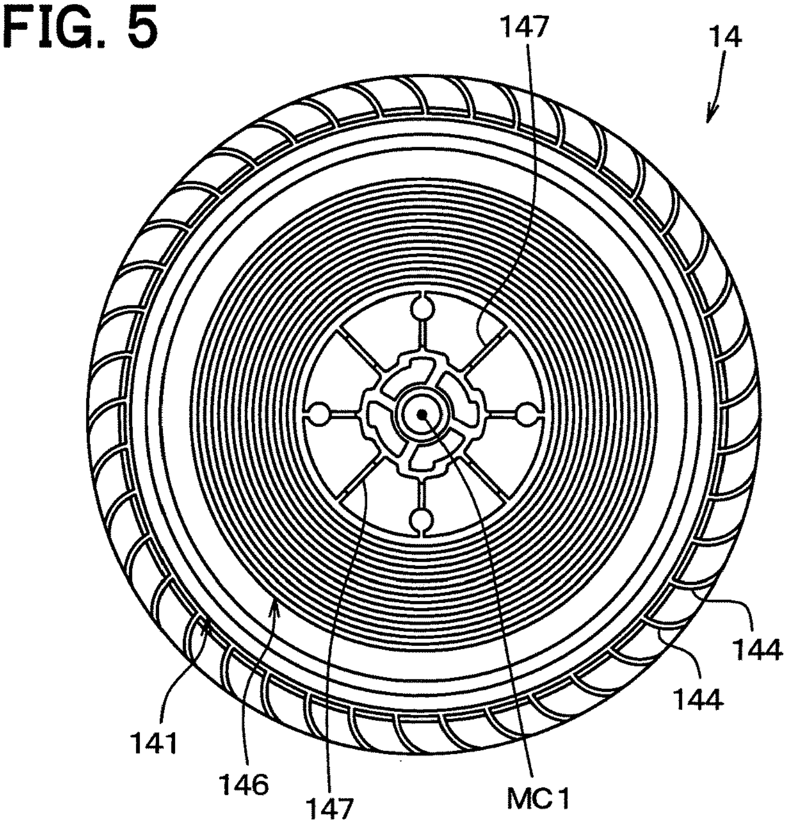
FIG. 5 is a bottom view of an impeller of a blower according to a second embodiment, corresponding to FIG. 3 of the first embodiment.

FIG. 5 is a view in which the impeller 14 of the blower 10 of this embodiment is seen in the arrow direction III of FIG. 2, and corresponds to FIG. 3 of the first embodiment. In this embodiment, the number of the radial ribs 147 of the impeller 14 adjacent to the electric motor 12 is reduced, compared with the first embodiment, which is easily understood by comparing FIG. 5 with FIG. 3. This is the point different from the first embodiment, and the other portion is the same as the first embodiment. Concretely, the number of the radial ribs 147 in this embodiment is eight as shown in FIG. 5.

Therefore, according to this embodiment, compared with the first embodiment, the same effects can be acquired as the first embodiment while the amount of the wear powder PD (refer to FIG. 1) caught by the radial rib 147 is decreased in this embodiment.

Third Embodiment

A third embodiment is described. A point different from the first embodiment is mainly explained.

Figure 6:
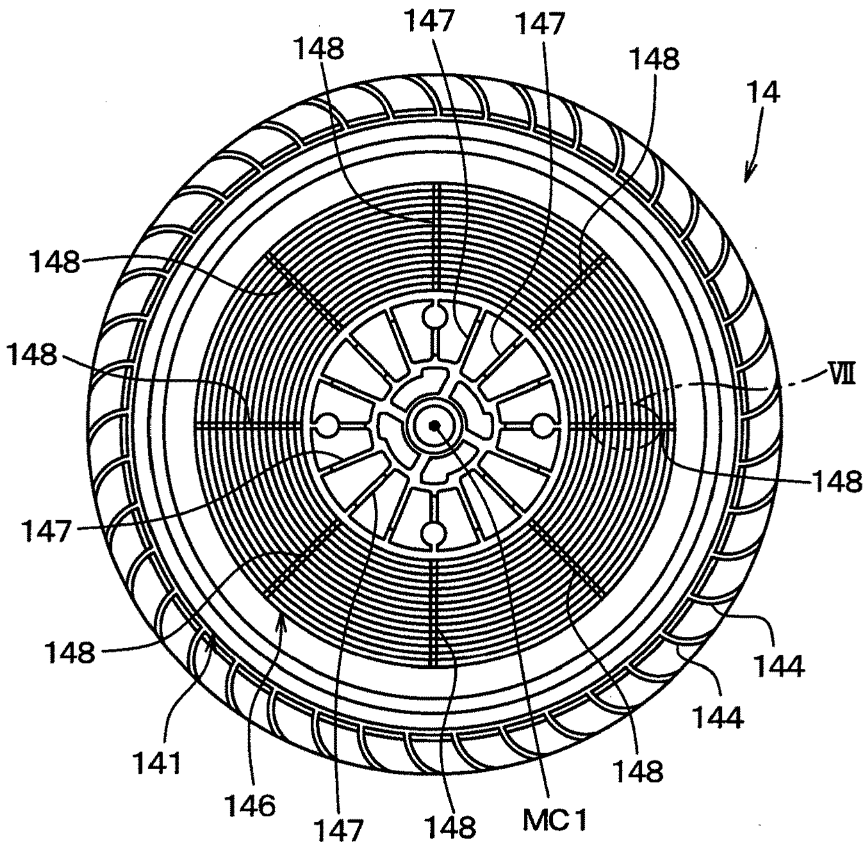
FIG. 6 is a bottom view of an impeller of a blower according to a third embodiment, corresponding to FIG. 3 of the first embodiment.

FIG. 6 is a view in which the impeller 14 of the blower 10 of this embodiment is seen in the arrow direction III of FIG. 2, and corresponds to FIG. 3 of the first embodiment. As shown in FIG. 6, in this embodiment, the uneven part 146 on the main plate 141 of the impeller 14 has plural connection ribs 148 which connect the adjacent protrusion parts 146*a* in the motor radial direction. This is the point different from the first embodiment, and the other portion is the same as the first embodiment.

Figure 7:
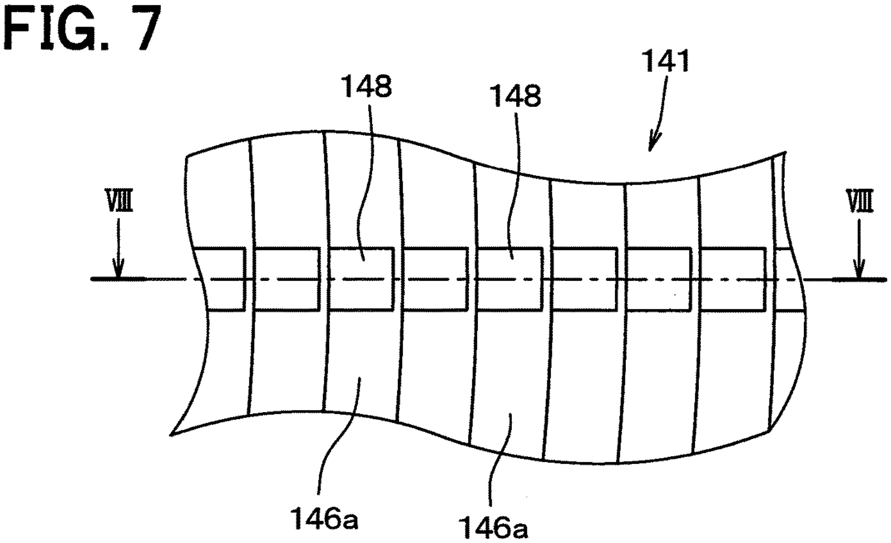
FIG. 7 is an enlarged view of a section VII of FIG. 6.
Figure 8:
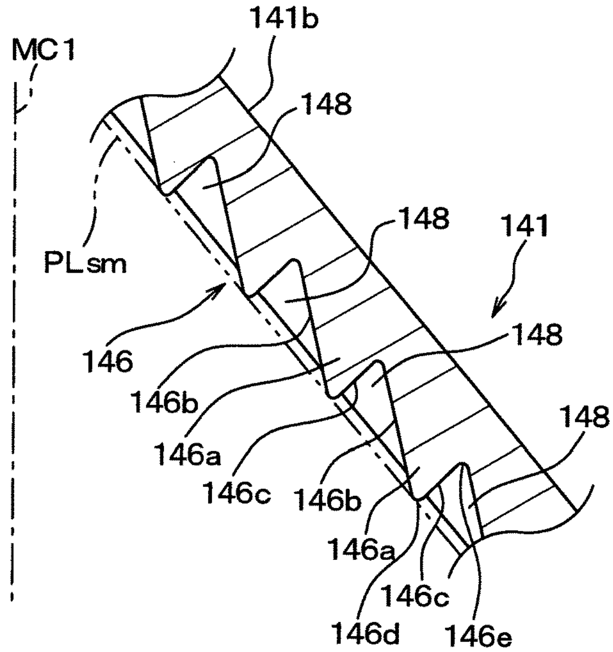
FIG. 8 is a cross-sectional view taken along a line VIII-VIII of FIG. 7.

As shown in FIG. 6, eight of the connection ribs 148 extend radially in the motor radial direction. In detail, as shown in FIG. 7 and FIG. 8, each of the connection ribs 148 is formed to project toward the electric motor 12 in the main plate 141, and is formed so that the amount of projection, i.e., rib height, may not exceed the top part 146*d* of the protrusion part 146*a*. FIG. 7 is a detail view of the VII portion in FIG. 6, and FIG. 8 is a cross-sectional view taken along a line VIII-VIII of FIG. 7.

The connection rib 148 is configured to couple the first protrusion surface 146*b* of one protrusion part 146*a* and the second protrusion surface 146*c* of the other protrusion part 146*a*, where the one protrusion part 146*a* and the other protrusion part 146*a* are adjacent to each other in the motor radial direction.

According to this embodiment, the uneven part 146 of the impeller 14 has the connection ribs 148 which connect the adjacent protrusion parts 146*a* in the motor radial direction. Since the main plate 141 of the impeller 14 has the uneven part 146, the thickness of the main plate 141 is uneven. Therefore, when fabricating the impeller 14 by injection molding, a difference is easily generated in the amount of contraction depending on the position in the main plate 141. As opposed to this, the difference in the amount of contraction can be reduced by the connection rib 148 connecting the adjacent protrusion parts 146*a* in the motor radial direction. The difference in the amount of contraction can be suppressed by the connection rib 148. Specifically, at a time of fabricating the impeller 14, the contraction of the main plate 141 is restricted in the motor radial direction, and it is possible to improve the property of removing the die at the time of fabrication.

According to this embodiment, the wear powder PD (refer to FIG. 1) can be caught similarly to the first embodiment. This embodiment is one of modifications relative to the first embodiment, and it is also possible to combine this embodiment with the second embodiment.

Fourth Embodiment

A fourth embodiment is described. A point different from the second embodiment is mainly explained.

Figure 9:
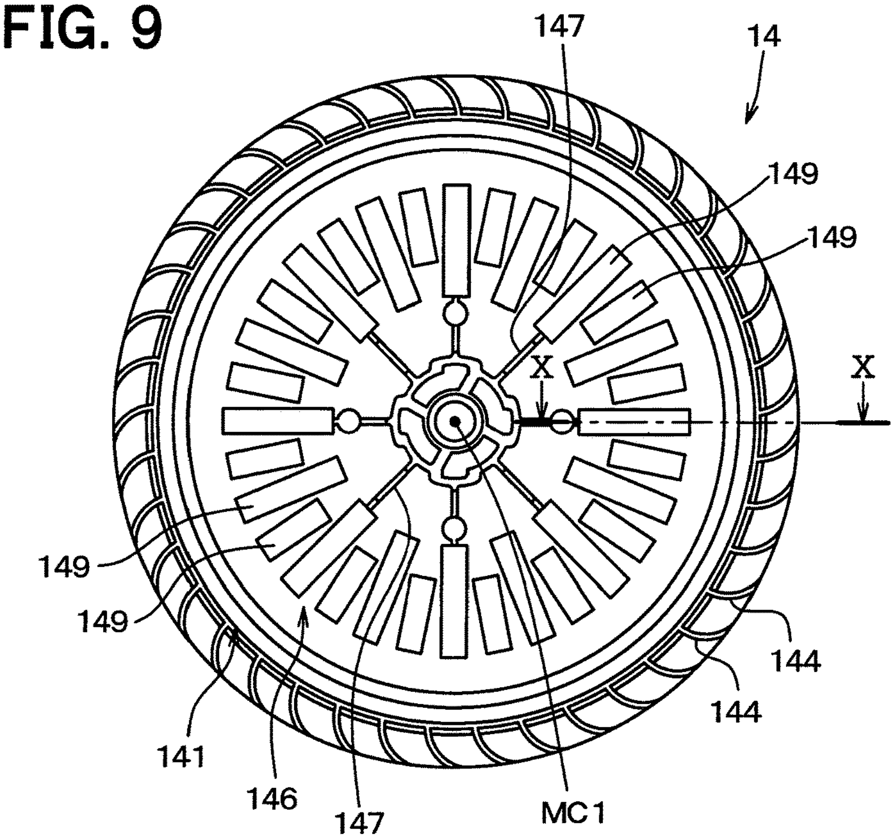
FIG. 9 is a bottom view of an impeller of a blower according to a fourth embodiment, corresponding to FIG. 5 of the second embodiment.

FIG. 9 is a view in which the impeller 14 of the blower 10 of this embodiment is seen in the arrow direction III of FIG. 2, and corresponds to FIG. 5 of the second embodiment. As shown in FIG. 9, in this embodiment, the uneven part 146 of the main plate 141 is different from the first embodiment.

The uneven part 146 of this embodiment has plural concave portions 149 defined in the one surface 141*a* of the main plate 141, instead of the protrusion parts 146*a* (refer to FIG. 4). Each of the concave portions 149*s* arranged in the motor circumferential direction on the one surface 141*a* has rectangle form.

Figure 10:
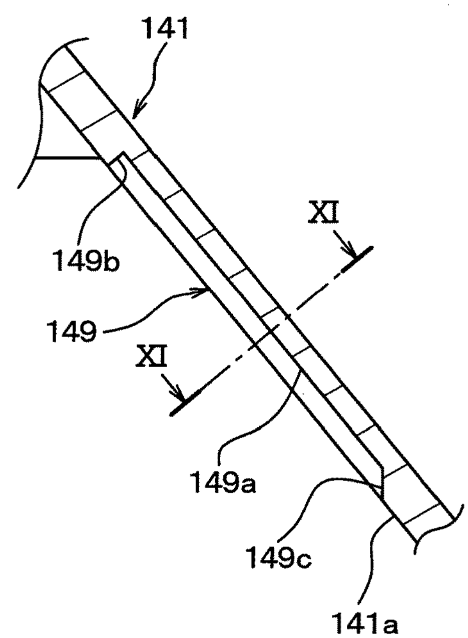
FIG. 10 is a cross-sectional view taken along a line X-X of FIG. 9.
Figure 11:
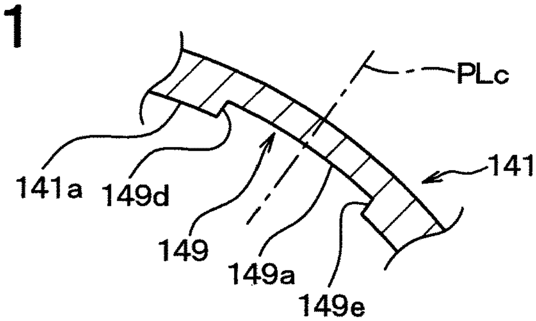
FIG. 11 is a cross-sectional view taken along a line XI-XI of FIG. 10.

In detail, as shown in FIG. 10 and FIG. 11, each of the concave portions 149 is recessed. FIG. 10 is a cross-sectional view taken along a line X-X of FIG. 9, and FIG. 11 a cross-sectional view taken along a line XI-XI of FIG. 10. As shown in the FIG. 10 and FIG. 11, the concave portion 149 has a bottom surface 149*a* forming the shape of a concave and four sides 149*b*, 149*c*, 149*d*, 149*e*. Specifically, among the four sides 149*b*, 149*c*, 149*d*, 149*e*, the first side 149*b* is arranged on the inner side in the motor radial direction and the second side 149*c* is arranged on the outer side in the motor radial direction, of the sides arranged in the motor radial direction. The third side 149*d* and the fourth side 149*e* oppose to each other in the motor circumferential direction.

The first side 149*b* is a surface parallel to the thickness direction of the main plate 141. In other words, the first side 149*b* is a surface perpendicular to the one surface 141*a* of the main plate 141.

The second side 149*c* is a cylindrical surface parallel to the motor axial center MC1. The third side 149*d* and the fourth side 149*e* are planes parallel to a plane PLc which passes through the center of the bottom surface 149*a* and which includes the motor axial center MC1 (refer to FIG. 2).

The bottom surface 149*a* is formed so that the cross-sectional form becomes parallel to the one surface 141*a*.

Since the bottom surface 149*a* and the four sides 149*b*, 149*c*, 149*d*, 149*e* are formed as mentioned above, the bottom surface 149*a* and the second side 149*c* are surfaces facing inward in the motor radial direction than the radial direction plane PLr (refer to FIG. 2), of the sides 149*a*, 149*b*, 149*c*, 149*d*, 149*e* which constitute the concave portion 149.

Therefore, the surface shape of the uneven part 146 is formed so that the total surface area of the surface facing inward in the motor radial direction than the radial direction plane PLr, of the whole surface of the uneven part 146, is larger than the imaginary smooth surface PLsm (refer to FIG. 4) assumed to be a smooth surface without the uneven part 146. In other words, the total surface area of the surface facing inward in the motor radial direction than the radial direction plane PLr is increased by the concave portion 149 compared with a configuration where the one surface 141*a* is assumed to be a smooth surface, on the one surface 141*a* of the main plate 141.

According to this embodiment, when the impeller 14 rotates, since air stagnates near the third side 149*d* or the fourth side 149*e* of the concave portion 149, wear powder PD (refer to FIG. 1) easily stays at the stagnant part. Thus, the performance of the impeller 14 which catches the wear powder PD can be improved.

In this embodiment mentioned above, the wear powder PD (refer to FIG. 1) can be caught similarly to the first embodiment. Although this embodiment is one of modifications of the second embodiment, it is also possible to combine this embodiment with the first embodiment.

Other Embodiment

In each embodiment, the blower 10 is a sirocco fan, and may be a turbofan or a radial fan.

In each embodiment, the blower 10 is used for an air-conditioner for a vehicle, and may be used for other uses.

In the first to third embodiments, the top part 146*d* and the lowermost part 146*e* of the protrusion part 146*a* of the main plate 141 of the impeller 14 has the minute roundness, and may not have the minute roundness.

In the first embodiment, as shown in FIG. 1, the uneven part 146 of the main plate 141 spreads outward in the motor radial direction than the position on the one surface 141*a* overlapping with the outer side of the brush 125 of the electric motor 12 in the motor radial direction. The uneven part 146 may further spread in a range wider than FIG. 1. Alternatively, the range of the uneven part 146 on the one surface 141*a* may be narrower than FIG. 1. This is the same as in the second to fourth embodiments.

In the first to third embodiments, the triangle cross-sectional form is the same in the size among the protrusion parts 146*a* on the main plate 141 of the impeller 14 as shown in FIG. 2 and FIG. 4, and may be different in the size and the shape.

In the first to third embodiments, the uneven part 146 of the impeller 14 is constituted by the protrusion parts 146*a* continuously arranged adjacent to each other as shown in FIG. 2 and FIG. 4, and the protrusion parts 146*a* may be intermittently located with a clearance therebetween.

In each embodiment, the cooling wind outlet pore 122*a* is a penetration hole passing through the casing in parallel with the motor axial center MC1, such that air is blown out toward the main plate 141 of the impeller 14 in the direction along the motor axial center MC1. A guide rib 128 may be further arranged around the cooling wind outlet pore 122*a* of the electric motor 12 to guide the flow of air to be blown in the direction along the motor axial center MC1.

Figure 12:
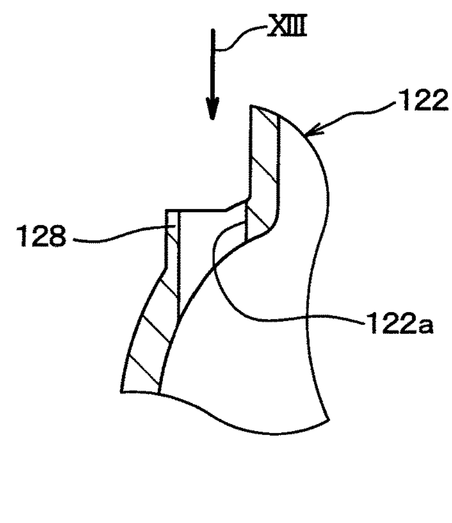
FIG. 12 is an enlarged view illustrating a modification in a section XII of FIG. 1.
Figure 13:
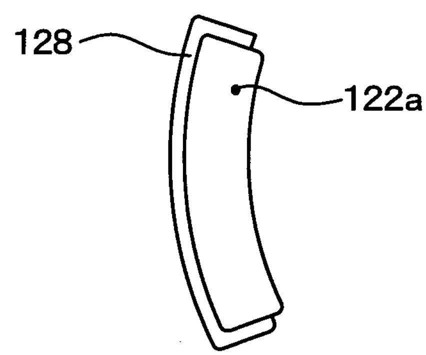
FIG. 13 is a view seen in an arrow direction XIII of FIG. 12.

As shown in FIG. 12 and FIG. 13, the guide rib 128 is formed to project on the outer side of the housing 122 in parallel with the motor axial center MC1 (refer to FIG. 1) and to surround the cooling wind outlet pore 122*a*. The air blown out of the cooling wind outlet pore 122*a* can be easily directed to flow along the motor axial center MC1 by the guide rib 128. The effect by the guide rib 128 becomes so remarkable as the thickness of the housing 122 is thinner, where the cooling wind outlet pore 122*a* is formed. FIG. 12 is an enlarged detail view which indicates XII portion of FIG. 1 in a modification of the first embodiment, and FIG. 13 is a view seen in the arrow direction XIII in FIG. 12. The guide rib 128 shown in FIG. 12 is formed to project outward of the housing 122, and may be formed to project inward of the housing 122.

In the first embodiment, the uneven part 146 is formed in the shape of concentric circles around the motor axial center MC1, and may not be the concentric circles as long as the center-off of the impeller 14 relative to the motor axial center MC1 is not increased. For example, the uneven part 146 may be formed in a point symmetry shape at a center corresponding to the motor axial center MC1, or in a line symmetry shape at a center corresponding to the plane containing the motor axial center MC1. This is the same as in the second to fourth embodiments.

In each embodiment, the wear powder PD is generated by friction when the commutator 124 slides in contact with the brush 125. However, the wear powder PD is not limited to be fine particles.

It should be appreciated that the present disclosure is not limited to the embodiments described above and can be modified appropriately within the scope of the appended claims. The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

What is claimed is:

1. A centrifugal multiblade blower comprising:

an electric motor having a motor rotation shaft that rotates at a motor axial center, a commutator that rotates with the motor rotation shaft, and a brush in contact with the commutator; and an impeller having a main plate connected with the motor rotation shaft to rotate integrally with the motor rotation shaft, and a plurality of blades connected with the main plate and arranged around the motor axial center, the impeller blowing off air outward in a radial direction by being rotated by the electric motor, wherein the main plate has one surface facing the electric motor in a thickness direction of the main plate, the one surface is in contact with air passing through inside of the electric motor, the one surface has an uneven part with an uneven surface shape, the uneven part has a plurality of protrusion parts, wherein each of the protrusion parts extends in a circumferential direction entirely around the motor axial center, and the uneven surface shape of the uneven part is formed in a manner that, among a whole surface of the uneven part, a total surface area of a taper surface facing inward in the radial direction and being inclined relative to the motor axial center is larger than an imaginary smooth surface, on which the surface shape of the uneven part is defined, is a smooth surface without the uneven part.

2. The centrifugal multiblade blower according to claim 1, wherein the uneven part is arranged in at least a part of a range covering from a position on the one surface overlapping with an outer side of the brush in the radial direction to a periphery side of the main plate.

3. The centrifugal multiblade blower according to claim 1, wherein the electric motor has a stator disposed around the motor axial center, and a yoke that receives the stator, and the uneven part is formed so that a maximum outer diameter of the uneven part around the motor axial center is larger than an outer diameter of the yoke.

4. The centrifugal multiblade blower according to claim 1, wherein the main plate has a central part connected with the motor rotation shaft, and is formed to extend from the central part to one side in an axial direction of the motor axial center as spreading outward in the radial direction in a manner that the one surface is an inner surface of the main plate.

5. The centrifugal multiblade blower according to claim 1, wherein the uneven part of the impeller is configured to be charged by friction between air and the uneven part caused by rotation of the impeller.

6. The centrifugal multiblade blower according to claim 1, wherein each of the protrusion parts that extends in the circumferential direction forms a shape of a ring centering at the motor axial center.

7. The centrifugal multiblade blower according to claim 1, wherein the taper surface facing inward in the radial direction and being inclined relative to the motor axial center is a first taper surface, each of the protrusion parts of the main plate has a shape of a triangle in a cross-sectional form, which is defined by the first taper surface and a second taper surface facing outward in the motor radial direction and being inclined relative to the motor axial center, each of the protrusion parts has a top part defined between the first taper surface and the second taper surface, and the imaginary smooth surface is defined to extend along all of the top parts of the protrusion parts.

8. The centrifugal multiblade blower according to claim 1, wherein the uneven part is disposed not to enlarge an off-center of the impeller relative to the motor axial center.

9. The centrifugal multiblade blower according to claim 1, wherein the electric motor has an air exit from which air flowing through inside of the electric motor is blown out, and the air exit is defined so that the air is blown out in a direction along the motor axial center toward the one surface of the main plate.

10. The centrifugal multiblade blower according to claim 1, wherein the protrusion part is formed so that a cross-sectional form of the protrusion part taken along a plane containing the motor axial center has a shape of a triangle tapered to a tip end.

11. The centrifugal multiblade blower according to claim 10, wherein the plurality of protrusion parts are arranged in the radial direction along the one surface, and a groove is defined between the protrusion parts adjacent to each other, and the uneven part has a connection rib that connects the protrusion parts adjacent to each other.

12. The centrifugal multiblade blower according to claim 10, wherein the protrusion part has a pair of protrusion surfaces that forms the cross-sectional form having the shape of the triangle, and one of the pair of protrusion surfaces faces inward in the radial direction around the motor axial center relative to the imaginary plane.

13. The centrifugal multiblade blower according to claim 12, wherein the other of the pair of protrusion surfaces faces outward in the radial direction around the motor axial center relative to the imaginary plane.

14. A centrifugal multiblade blower comprising:

an electric motor having a motor rotation shaft that rotates at a motor axial center, a commutator that rotates with the motor rotation shaft, and a brush in contact with the commutator; and an impeller having a main plate connected with the motor rotation shaft to rotate integrally with the motor rotation shaft, and a plurality of blades connected with the main plate and arranged around the motor axial center, the impeller blowing off air outward in a radial direction by being rotated by the electric motor, wherein the main plate has one surface facing the electric motor in a thickness direction of the main plate, the one surface is in contact with air passing through inside of the electric motor, the one surface has an uneven part with an uneven surface shape, the uneven part has a plurality of protrusion parts, a groove is defined between the protrusion parts adjacent to each other, wherein each groove extends in a circumferential direction completely around the motor axial center, and the uneven surface shape of the uneven part is formed in a manner that, among a whole surface of the uneven part, a total surface area of a taper surface facing inward in the radial direction and being inclined relative to the motor axial center is larger than an imaginary smooth surface, on which the surface shape of the uneven part is defined, is a smooth surface without the uneven part.

15. The centrifugal multiblade blower according to claim 14, wherein each of the protrusion parts that extends in the circumferential direction forms a shape of a ring centering at the motor axial center.

16. The centrifugal multiblade blower according to claim 14, wherein the taper surface facing inward in the radial direction and being inclined relative to the motor axial center is a first taper surface, each of the protrusion parts of the main plate has a shape of a triangle in a cross-sectional form, which is defined by the first taper surface and a second taper surface facing outward in the motor radial direction and being inclined relative to the motor axial center, each of the protrusion parts has a top part defined between the first taper surface and the second taper surface, and the imaginary smooth surface is defined to extend along all of the top parts of the protrusion parts.

17. The centrifugal multiblade blower according to claim 14, wherein the protrusion part is formed so that a cross-sectional form of the protrusion part taken along a plane containing the motor axial center has a shape of a triangle tapered to a tip end.

18. The centrifugal multiblade blower according to claim 17, wherein the protrusion part has a pair of protrusion surfaces that forms the cross-sectional form having the shape of the triangle, and one of the pair of protrusion surfaces faces inward in the radial direction around the motor axial center relative to the imaginary plane.

19. The centrifugal multiblade blower according to claim 18, wherein the other of the pair of protrusion surfaces faces outward in the radial direction around the motor axial center relative to the imaginary plane.

* * * * *